US010338882B2

(12) United States Patent
VanBlon et al.

(10) Patent No.: US 10,338,882 B2
(45) Date of Patent: Jul. 2, 2019

(54) CONTEXTUAL BASED SELECTION AMONG MULTIPLE DEVICES FOR CONTENT PLAYBACK

(71) Applicant: Lenovo (Singapore) Pte. Ltd., Singapore (SG)

(72) Inventors: Russell Speight VanBlon, Raleigh, NC (US); Arnold S. Weksler, Raleigh, NC (US); John Carl Mese, Cary, NC (US); Nathan J. Peterson, Oxford, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 131 days.

(21) Appl. No.: 15/276,352

(22) Filed: Sep. 26, 2016

(65) Prior Publication Data
US 2018/0088894 A1 Mar. 29, 2018

(51) Int. Cl.
G06F 3/16 (2006.01)
G06F 3/0482 (2013.01)

(52) U.S. Cl.
CPC ............ G06F 3/165 (2013.01); G06F 3/0482 (2013.01)

(58) Field of Classification Search
CPC .................................. G06F 3/16; G06F 3/0482
See application file for complete search history.

(56) References Cited

U.S. PATENT DOCUMENTS

| 2011/0196519 | A1* | 8/2011 | Khoury | H04N 21/4104 700/94 |
| 2014/0059444 | A1* | 2/2014 | Yun | H04L 41/22 715/738 |
| 2016/0112359 | A1* | 4/2016 | Allen | H04L 51/14 709/206 |
| 2017/0099592 | A1* | 4/2017 | Loeb | H04L 67/303 |
| 2017/0186019 | A1* | 6/2017 | Loeb | G07F 17/3227 |
| 2017/0344194 | A1* | 11/2017 | Peterson | G06F 3/0482 |
| 2018/0088894 | A1* | 3/2018 | VanBlon | G06F 3/162 |

* cited by examiner

Primary Examiner — David E Choi
(74) Attorney, Agent, or Firm — Ference & Associates LLC

(57) ABSTRACT

One embodiment provides a method, including: receiving, at an electronic device, a request to play media content; accessing, using a processor of the electronic device, a list of user devices; identifying, using the processor, user specific contextual data associated with the list of user devices; selecting, using the processor, a user device from the list of user devices based on the user specific contextual data; and playing, with the user device selected, the media content. Other aspects are described and claimed.

20 Claims, 3 Drawing Sheets

CONTEXTUAL BASED SELECTION AMONG MULTIPLE DEVICES FOR CONTENT PLAYBACK

BACKGROUND

Electronic devices, e.g., a media player, a smart television, a laptop or tablet computing device, a smart phone, combinations thereof, etc., herein "devices," are capable of responding to user inputs to perform actions, e.g., command actions such as playing media files. In an environment where more than one media playback device may be selected, users are often faced with a task of selecting form a list of devices.

For example, a user that wants to select media content on one device, e.g., a tablet computing device, and thereafter wishes to play back the media content on another device, e.g., a television set, must select the television set as a target device, e.g., from a listing of possible target devices on the tablet computing device. If only the television set is available, i.e., the list includes only the television, or if the television and the tablet computing device are uniquely paired with one another, the playback device may be selected automatically. However, if more than one device is capable of playback, e.g., a television and a laptop computer, a user often must manually select the device from a list of devices.

BRIEF SUMMARY

In summary, one aspect provides a method, comprising: receiving, at an electronic device, a request to play media content; accessing, using a processor of the electronic device, a list of user devices; identifying, using the processor, user specific contextual data associated with the list of user devices; selecting, using the processor, a user device from the list of user devices based on the user specific contextual data; and playing, with the user device selected, the media content.

Another aspect provides an electronic device, comprising: a processor; and a memory device that stores instructions executable by the processor to: receive a request to play media content; access a list of user devices; identify user specific contextual data associated with the list of user devices; select a user device from the list of user devices based on the user specific contextual data; and play, with the user device selected, the media content.

A further aspect provides a product, comprising: a storage device that stores code, the code being executable by a processor and comprising: code that receives, at an electronic device, a request to play media content; code that accesses, using a processor of the electronic device, a list of user devices; code that identifies, using the processor, user specific contextual data associated with the list of user devices; code that selects, using the processor, a user device from the list of user devices based on the user specific contextual data; and code that plays, with the user device selected, the media content.

The foregoing is a summary and thus may contain simplifications, generalizations, and omissions of detail; consequently, those skilled in the art will appreciate that the summary is illustrative only and is not intended to be in any way limiting.

For a better understanding of the embodiments, together with other and further features and advantages thereof, reference is made to the following description, taken in conjunction with the accompanying drawings. The scope of the invention will be pointed out in the appended claims.

DETAILED DESCRIPTION

Figure 1:
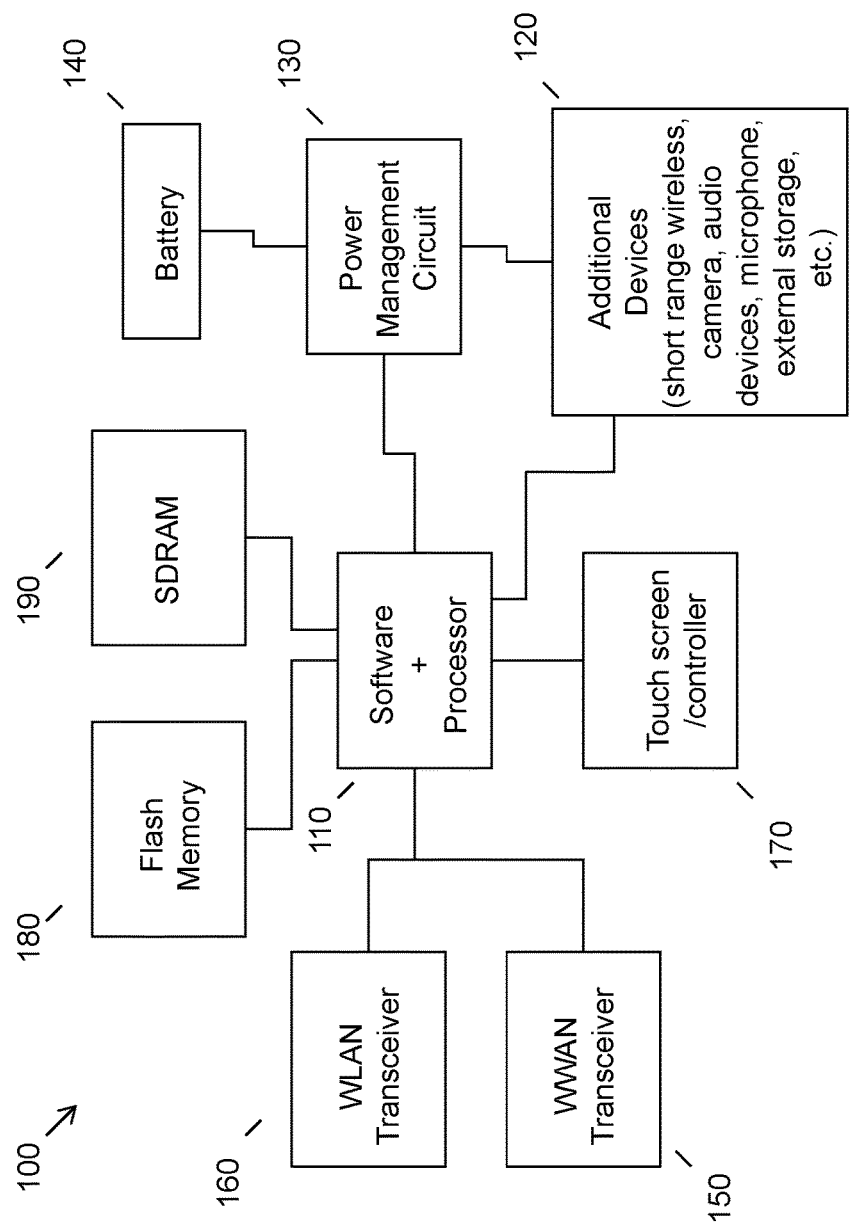
FIG. 1 illustrates an example of information handling device circuitry.

It will be readily understood that the components of the embodiments, as generally described and illustrated in the figures herein, may be arranged and designed in a wide variety of different configurations in addition to the described example embodiments. Thus, the following more detailed description of the example embodiments, as represented in the figures, is not intended to limit the scope of the embodiments, as claimed, but is merely representative of example embodiments.

Reference throughout this specification to "one embodiment" or "an embodiment" (or the like) means that a particular feature, structure, or characteristic described in connection with the embodiment is included in at least one embodiment. Thus, the appearance of the phrases "in one embodiment" or "in an embodiment" or the like in various places throughout this specification are not necessarily all referring to the same embodiment.

Furthermore, the described features, structures, or characteristics may be combined in any suitable manner in one or more embodiments. In the following description, numerous specific details are provided to give a thorough understanding of embodiments. One skilled in the relevant art will recognize, however, that the various embodiments can be practiced without one or more of the specific details, or with other methods, components, materials, et cetera. In other instances, well known structures, materials, or operations are not shown or described in detail to avoid obfuscation.

Conventionally content playback is targeted towards particular devices, rather than taking users (making the playback requests and/or consuming the media content) into account. For example, casting content to a playback device conventionally involves requiring the user to choose from a list of devices that are listed alphabetically or according to some other static, default rule, e.g., distance from the user device issuing the playback request. However, this technique does not take into account user specific preferences, anticipated activities, relevance of content type or device type to particular users, etc.

An embodiment automatically chooses a relevant playback device from among a list of possible playback devices based on what is contextually relevant for the user making the playback request, for the user consuming the media content, or both. For example, if a user is in the middle of watching media content on a particular user device and issues a playback request for other media content to be played back, an embodiment determines which of the possible playback devices, including the playback device currently being used, is the most appropriate. By way of specific example, if the user is an adult user watching a television program on a first device, and requests that a cartoon be played, an embodiment accesses contextual data that indicates that another user, e.g., a child, is located near another of the possible playback devices, and furthermore that the child typically views the cartoon series or like programming. Thus, an embodiment may select the other playback device to play the cartoon, leaving the adult user and the television program being played on the first device uninterrupted.

Non-limiting examples of user specific contextual data that might be utilized, alone or in some combination, include but are not limited to the following.

The user specific contextual data may associate a current or predicted user activity with a particular playback device. For example, if a user is detected as issuing the playback request, and the user is a known to engage in a particular activity at or near the time of the playback request, e.g., exercise, the user specific contextual data associates a device, e.g., exercise equipment, a mobile device used during exercise, etc., with the user and the current playback request.

The user specific contextual data may associate a user and/or a device with a known pattern of user behavior, e.g., a history of playing back a content type similar to that of the media content indicated by the playback request. Thus, a specific user and/or a specific device may be associated with the media content of the playback request.

The user specific contextual data may be dynamically updated, e.g., based on user location or proximity to a playback device. For example, if a user's identity is mentioned in the playback request or otherwise obtainable, e.g., via biometric identification, the playback request may be directed to a device currently associated with the identified user. Therefore, the user specific contextual data may comprise a real-time or current association between a user and a playback device. For example, a device may obtain user specific contextual data in response to a playback request, e.g., capture an image and/or audio data, in an effort to determine if a specific user is proximately located to a given playback device when the request is issued.

The user specific contextual data may comprise device availability and/or capability data. For example, certain playback devices may only handle particular types of media content, e.g., have media players capable of processing certain media file types, etc. Thus, the user specific contextual data may comprise an association between a media content type and a device capability. The user specific contextual data may further comprise an association between a media playback request and a device's current availability, e.g., powered on/off, currently in use, currently in use by a particular user, etc.

The user specific contextual data may comprise preferences. For example, a particular type of device, e.g., tablet computing device, may be known to be used for playing back certain media types, e.g., web based videos, whereas another playback device might be known to play back other media types, e.g., music players may be associated with playing audio files. Further, the preference data may be associated with a user, e.g., a user typically chooses to play a certain type of media using a certain device, etc. Therefore, the user specific contextual data may comprise preference data with respect to media content type, a user's habits for playing the media content type, etc.

The illustrated example embodiments will be best understood by reference to the figures. The following description is intended only by way of example, and simply illustrates certain example embodiments.

While various other circuits, circuitry or components may be utilized in information handling devices, with regard to smart phone and/or tablet circuitry 100, an example illustrated in FIG. 1 includes a system on a chip design found for example in tablet or other mobile computing platforms. Software and processor(s) are combined in a single chip 110. Processors comprise internal arithmetic units, registers, cache memory, busses, I/O ports, etc., as is well known in the art. Internal busses and the like depend on different vendors, but essentially all the peripheral devices (120) may attach to a single chip 110. The circuitry 100 combines the processor, memory control, and I/O controller hub all into a single chip 110. Also, systems 100 of this type do not typically use SATA or PCI or LPC. Common interfaces, for example, include SDIO and I2C.

There are power management chip(s) 130, e.g., a battery management unit, BMU, which manage power as supplied, for example, via a rechargeable battery 140, which may be recharged by a connection to a power source (not shown). In at least one design, a single chip, such as 110, is used to supply BIOS like functionality and DRAM memory.

System 100 typically includes one or more of a WWAN transceiver 150 and a WLAN transceiver 160 for connecting to various networks, such as telecommunications networks and wireless Internet devices, e.g., access points. Additionally, devices 120 are commonly included, e.g., a microphone for receiving voice commands, a camera for receiving image data including gestures, etc. System 100 often includes a touch screen 170 for data input and display/rendering. System 100 also typically includes various memory devices, for example flash memory 180 and SDRAM 190.

Figure 2:
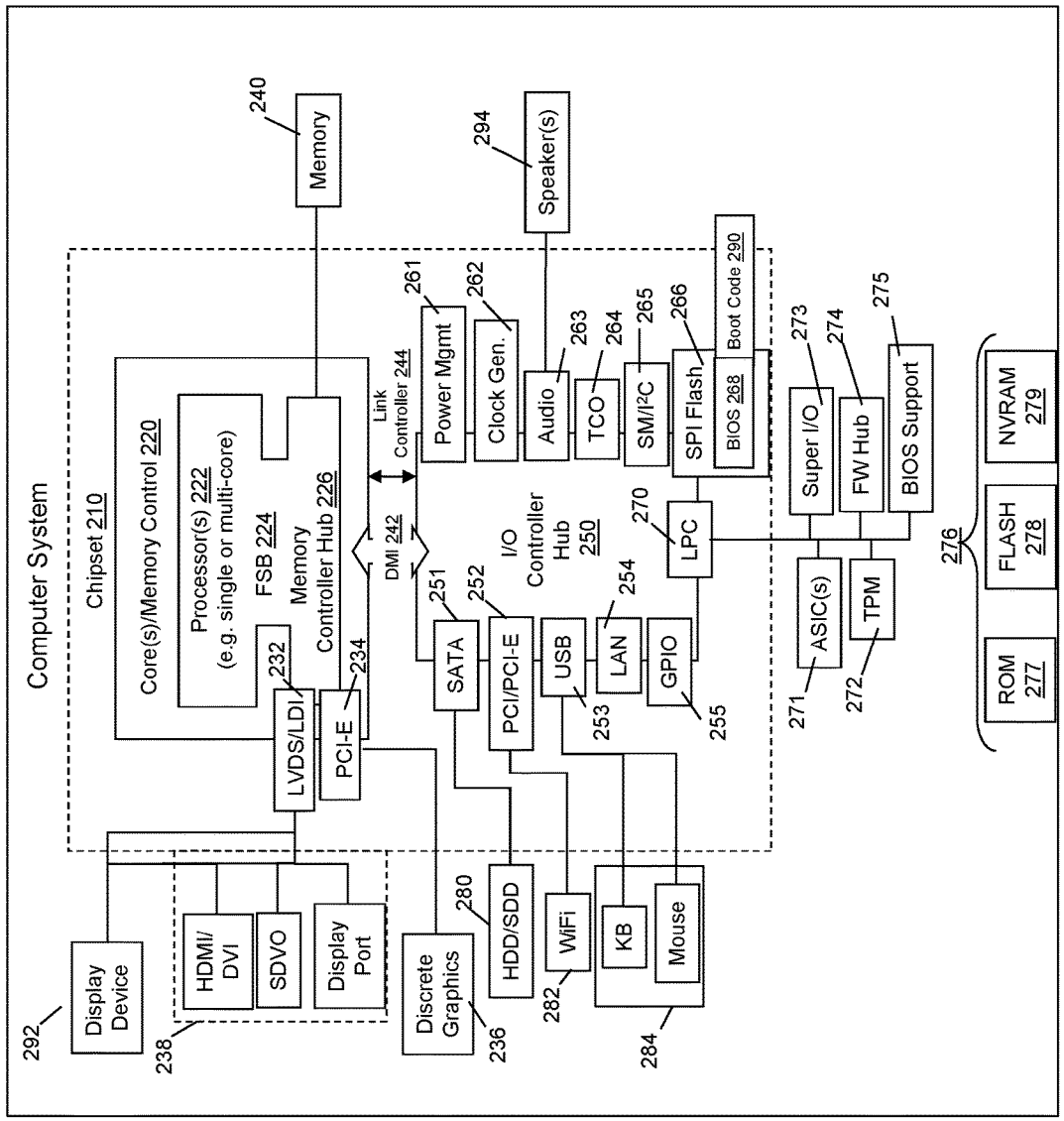
FIG. 2 illustrates another example of information handling device circuitry.

FIG. 2 depicts a block diagram of another example of information handling device circuits, circuitry or components. The example depicted in FIG. 2 may correspond to computing systems such as the THINKPAD series of personal computers sold by Lenovo (US) Inc. of Morrisville, N.C., or other devices. As is apparent from the description herein, embodiments may include other features or only some of the features of the example illustrated in FIG. 2.

The example of FIG. 2 includes a so-called chipset 210 (a group of integrated circuits, or chips, that work together, chipsets) with an architecture that may vary depending on manufacturer (for example, INTEL, AMD, ARM, etc.). INTEL is a registered trademark of Intel Corporation in the United States and other countries. AMD is a registered trademark of Advanced Micro Devices, Inc. in the United States and other countries. ARM is an unregistered trademark of ARM Holdings plc in the United States and other countries. The architecture of the chipset 210 includes a core and memory control group 220 and an I/O controller hub 250 that exchanges information (for example, data, signals, commands, etc.) via a direct management interface (DMI) 242 or a link controller 244. In FIG. 2, the DMI 242 is a chip-to-chip interface (sometimes referred to as being a link between a "northbridge" and a "southbridge"). The core and memory control group 220 include one or more processors 222 (for example, single or multi-core) and a memory controller hub 226 that exchange information via a front side bus (FSB) 224; noting that components of the group 220 may be integrated in a chip that supplants the conventional "northbridge" style architecture. One or more processors 222 comprise internal arithmetic units, registers, cache memory, busses, I/O ports, etc., as is well known in the art.

In FIG. 2, the memory controller hub 226 interfaces with memory 240 (for example, to provide support for a type of RAM that may be referred to as "system memory" or "memory"). The memory controller hub 226 further includes a low voltage differential signaling (LVDS) interface 232 for a display device 292 (for example, a CRT, a flat panel, touch screen, etc.). A block 238 includes some technologies that may be supported via the LVDS interface 232 (for example, serial digital video, HDMI/DVI, display port). The memory controller hub 226 also includes a PCI-express interface (PCI-E) 234 that may support discrete graphics 236.

In FIG. 2, the I/O hub controller 250 includes a SATA interface 251 (for example, for HDDs, SDDs, etc., 280), a PCI-E interface 252 (for example, for wireless connections 282), a USB interface 253 (for example, for devices 284 such as a digitizer, keyboard, mice, cameras, phones, microphones, storage, biometric data capture device, other connected devices, etc.), a network interface 254 (for example, LAN), a GPIO interface 255, a LPC interface 270 (for ASICs 271, a TPM 272, a super I/O 273, a firmware hub 274, BIOS support 275 as well as various types of memory 276 such as ROM 277, Flash 278, and NVRAM 279), a power management interface 261, a clock generator interface 262, an audio interface 263 (for example, for speakers 294), a TCO interface 264, a system management bus interface 265, and SPI Flash 266, which can include BIOS 268 and boot code 290. The I/O hub controller 250 may include gigabit Ethernet support.

The system, upon power on, may be configured to execute boot code 290 for the BIOS 268, as stored within the SPI Flash 266, and thereafter processes data under the control of one or more operating systems and application software (for example, stored in system memory 240). An operating system may be stored in any of a variety of locations and accessed, for example, according to instructions of the BIOS 268. As described herein, a device may include fewer or more features than shown in the system of FIG. 2.

Information handling device circuitry, as for example outlined in FIG. 1 or FIG. 2, may be used in devices found in a home environment, such as media players, mobile computing devices, smart TVs and the like. The circuitry and components used in such devices may vary according to their purpose. For example, a device may include a microphone and speech processing circuit or program in order to receive audible user input and determine a command contained therein or to perform user identification. Similarly, another device might include a camera and gesture processing circuit or program in order to receive gesture inputs performed by the user and match the same to command actions, to perform biometric identification of a user, etc.

Figure 3:
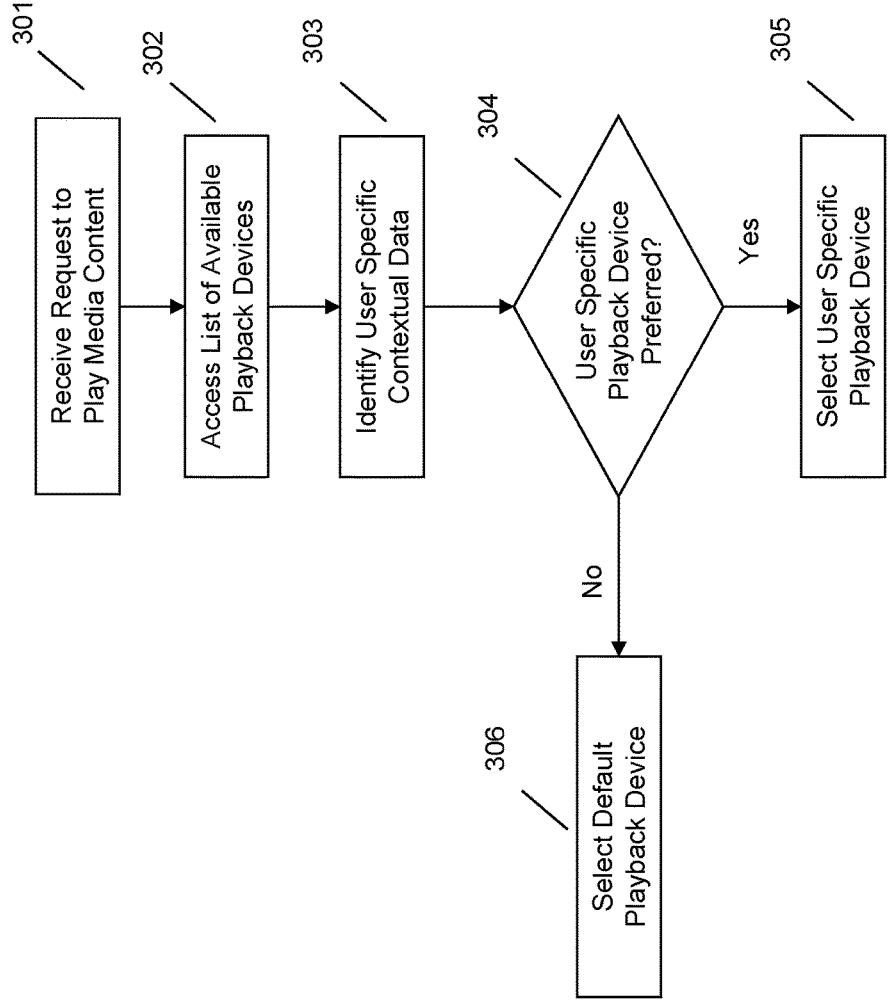
FIG. 3 illustrates an example method of selection among multiple local devices for content playback using contextual data.

Referring to FIG. 3, an example method of utilizing user specific contextual data to select a media playback device is illustrated. As shown, a request to play media content is first received at 301, e.g., by a handheld device of a user such as a smart phone or tablet computing device, by a voice activated media playback device, etc. While the device that received the media play request might be used to play the media content, often this will not be the most desirable outcome.

As described herein, a parent may be watching a show using the media playback device (e.g., a smart TV) that received a request to play a program for a child. By way of specific example, the parent may issue a voice command "play cartoon A for person b." The parent's intention might be for another device, e.g., in the child's room, to play the program for the child, rather than having the smart TV that received the command playback the cartoon. However, this is not made explicitly clear in the voice command of the parent.

Accordingly, an embodiment accesses a list of a list of user devices that are available for playback at 302. This might include having a program of the smart TV identify all devices within a home or personal area network that are currently available, e.g., powered on, powered on and not currently in use, etc. This data may be obtained and prepared by the smart TV and/or may be communicated to the smart TV by another device, e.g., a remote network device. The list of available devices may be dynamically updated, e.g., as new devices join a personal area network, are powered on or off, are put into use for playing media content or for use with other applications, etc. This permits a current list to be accessed in response to a playback request.

In order to select among these devices in a user specific way, an embodiment identifies user specific contextual data at 303. For example, an embodiment may identify the following user specific contextual data for the list of available devices to accommodate the example play request issued by the parent. First, the user specific contextual data identified may comprise data indicating that a known user, e.g., "person b," is associated with both the program requested for playback, here "cartoon A." If so, the user specific contextual data identified at 303 may comprise a user profile, here for "person b," that indicates a device preference, e.g., a device other than the smart TV. However, if there is a conflict, e.g., the preferred device is unavailable, further refinement using the user specific contextual data may be necessary.

By way of example, if the preferred device of "person b" is the device currently being used by the parent, i.e., the smart TV, an embodiment may issue a query to other devices, e.g., a device in person b's room, to gather user specific contextual data. By way of example, a request may be issued to a device in person b's room to detect the presence of a person or specifically person b. If a positive result is returned, i.e., person b is detectable by a device that has received the request, this device's identification may be added to the user specific contextual data identified at 303. Of course, this may be done proactively, e.g., prior to the receipt of the playback request.

Therefore, an embodiment may determine that a device that currently detects person b's presence at is preferred over another device, e.g., a device currently in use by the parent issuing the request, as illustrated at 304. This permits an embodiment to select, at 305, the device that is preferred on the basis of the user specific contextual data. If no such device is identified at 304, a default device may be used to process and complete the playback request, as illustrated at 306. For example, a static rule, e.g., a device listed first in an alphabetical list, might be selected for completing the playback request and play the media content.

An embodiment is therefore capable of resolving a preferred playback device using the user specific contextual data in a wide variety of circumstances. For example, an embodiment may obtain an identification of a user that issued the request to play the media content, in the example above the parent, where the user specific contextual data then includes an association between the user that issued the request to play the media content and the user device selected. In the example case of FIG. 3, this may permit an embodiment to prefer a device not currently utilized by the person issuing the playback request, e.g., based on the data indicating that this person is already watching a show using a specific device. This decision may be based in part on proximity between the user that issued the request to play the media content and the user device selected. For example, in the case that the parent is currently watching a show on the smart TV and requests "cartoon A" to be played for "person b," an embodiment might select a device that is not closest to the parent to complete the request.

A history of handling prior requests may inform the decision as to which playback device to select from the list. For example, a usage history for a given user and/or for a given device and/or for a given media content type may be used to predict a user's intent for handling a current playback request. By way of specific example, if the parent typically interrupts his or her program to watch children's programming with the child, an embodiment may determine at 304 that the parent wishes to interrupt his or her program and begin playback of the cartoon using the same device, in this example the smart TV. Thus, the smart TV that is currently playing the parent's show may be selected at 305 to playback the cartoon based on the usage history.

An embodiment therefore permits an improved, automated selection of a media playback device. This facilitates quick and accurate playback device selection that makes selection of an appropriate playback device more user friendly, particularly in an environment with many possible playback devices.

As will be appreciated by one skilled in the art, various aspects may be embodied as a system, method or device program product. Accordingly, aspects may take the form of an entirely hardware embodiment or an embodiment including software that may all generally be referred to herein as a "circuit," "module" or "system." Furthermore, aspects may take the form of a device program product embodied in one or more device readable medium(s) having device readable program code embodied therewith.

It should be noted that the various functions described herein may be implemented using instructions stored on a device readable storage medium, such as a non-signal storage device, that are executed by a processor. A storage device may be, for example, an electronic, magnetic, optical, electromagnetic, infrared, or semiconductor system, apparatus, or device, or any suitable combination of the foregoing. More specific examples of a storage medium would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a storage device is not a signal and "non-transitory" includes all media except signal media.

Program code embodied on a storage medium may be transmitted using any appropriate medium, including but not limited to wireless, wireline, optical fiber cable, RF, et cetera, or any suitable combination of the foregoing.

Program code for carrying out operations may be written in any combination of one or more programming languages. The program code may execute entirely on a single device, partly on a single device, as a stand-alone software package, partly on single device and partly on another device, or entirely on the other device. In some cases, the devices may be connected through any type of connection or network, including a local area network (LAN) or a wide area network (WAN), or the connection may be made through other devices (for example, through the Internet using an Internet Service Provider), through wireless connections, e.g., near-field communication, or through a hard wire connection, such as over a USB connection.

Example embodiments are described herein with reference to the figures, which illustrate example methods, devices and program products according to various example embodiments. It will be understood that the actions and functionality may be implemented at least in part by program instructions. These program instructions may be provided to a processor of a device, a special purpose information handling device, or other programmable data processing device to produce a machine, such that the instructions, which execute via a processor of the device implement the functions/acts specified.

It is worth noting that while specific blocks are used in the figures, and a particular ordering of blocks has been illustrated, these are non-limiting examples. In certain contexts, two or more blocks may be combined, a block may be split into two or more blocks, or certain blocks may be re-ordered or re-organized as appropriate, as the explicit illustrated examples are used only for descriptive purposes and are not to be construed as limiting.

As used herein, the singular "a" and "an" may be construed as including the plural "one or more" unless clearly indicated otherwise.

This disclosure has been presented for purposes of illustration and description but is not intended to be exhaustive or limiting. Many modifications and variations will be apparent to those of ordinary skill in the art. The example embodiments were chosen and described in order to explain principles and practical application, and to enable others of ordinary skill in the art to understand the disclosure for various embodiments with various modifications as are suited to the particular use contemplated.

Thus, although illustrative example embodiments have been described herein with reference to the accompanying figures, it is to be understood that this description is not limiting and that various other changes and modifications may be affected therein by one skilled in the art without departing from the scope or spirit of the disclosure.

What is claimed is:

1. A method, comprising:
receiving, at an electronic device, a request to play media content;
accessing, using a processor of the electronic device, a list of user devices;
identifying, using the processor, user specific contextual data associated with the list of user devices;
automatically selecting, using the processor and without user selection input, a user device from the list of user devices based on the user specific contextual data; and
playing, responsive to determining that the user device is not available, the media content on another user device associated with the user.

2. The method of claim 1, further comprising obtaining an identification of a user that issued the request to play the media content, wherein the user specific contextual data comprises an association between the user that issued the request to play the media content and the user device selected.

3. The method of claim 2, wherein the association is proximity between the user that issued the request to play the media content and the user device selected.

4. The method of claim 2, wherein the association is usage history.

5. The method of claim 4, wherein the usage history indicates that the user that issued the play request plays media content on a particular device.

6. The method of claim 1, further comprising obtaining an identification of the media content, wherein the user specific contextual data comprises an association between the media content and the user device selected.

7. The method of claim 6, further comprising obtaining an identification of a user, wherein the user specific contextual data comprises an association between the user identified and the user device selected.

8. The method of claim 1, wherein the user specific contextual data comprises a device type and device availability data.

9. The method of claim 1, wherein the electronic device comprises a first user device and wherein the user device selected comprises a second user device.

10. The method of claim 9, wherein the electronic device identifies the media content and thereafter transfers the content to the second user device.

11. An electronic device, comprising:
a processor; and
a memory device that stores instructions executable by the processor to:
receive a request to play media content;
access a list of user devices;
identify user specific contextual data associated with the list of user devices;
automatically select, without user selection input, a user device from the list of user devices based on the user specific contextual data; and
play, responsive to determining that the user device is not available, the media content on another user device associated with the user.

12. The electronic device of claim 11, wherein the instructions are executable by the processor to obtain an identification of a user that issued the request to play the media content, wherein the user specific contextual data comprises an association between the user that issued the play request and the user device selected.

13. The electronic device of claim 12, wherein the association is proximity between the user that issued the request to play the media content and the user device selected.

14. The electronic device of claim 12, wherein the association is usage history.

15. The electronic device of claim 14, wherein the usage history indicates that the user that issued the request to play the media content plays media content on a particular device.

16. The electronic device of claim 11, wherein the instructions are executable by the processor to obtain an identification of the media content, wherein the user specific contextual data comprises an association between the media content and the user device selected.

17. The electronic device of claim 16, wherein the instructions are executable by the processor to obtain an identification of a user, wherein the user specific contextual data comprises an association between the user identified and the user device selected.

18. The electronic device of claim 11, wherein the user specific contextual data comprises a device type and device availability data.

19. The electronic device of claim 11, wherein the electronic device comprises a first user device and wherein the user device selected comprises a second user device.

20. A product, comprising:
a storage device that stores code, the code being executable by a processor and comprising:
code that receives, at an electronic device, a request to play media content;
code that accesses, using a processor of the electronic device, a list of user devices;
code that identifies, using the processor, user specific contextual data associated with the list of user devices;
code that automatically selects, using the processor and without user selection input, a user device from the list of user devices based on the user specific contextual data; and
code that plays, responsive to determining that the user device is not available, the media content on another user device associated with the user.

* * * * *